United States Patent
Matsui et al.

(10) Patent No.: US 9,083,477 B2
(45) Date of Patent: Jul. 14, 2015

(54) COMMUNICATION SYSTEM AND COMMUNICATION APPARATUS

(75) Inventors: Takashi Matsui, Kobe (JP); Shinichiroh Takatomi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 82 days.

(21) Appl. No.: 13/419,710

(22) Filed: Mar. 14, 2012

(65) Prior Publication Data

US 2012/0243585 A1  Sep. 27, 2012

(30) Foreign Application Priority Data

Mar. 24, 2011  (JP) ................................. 2011-065652

(51) Int. Cl.
*H04B 1/38* (2006.01)
*H04L 12/40* (2006.01)
*H04J 3/06* (2006.01)

(52) U.S. Cl.
CPC ..... *H04J 3/0658* (2013.01); *H04L 2012/40215* (2013.01); *H04L 2012/40273* (2013.01)

(58) Field of Classification Search
CPC ..... B60G 17/0195; G06F 9/52; H04J 3/0658; H04L 2012/40215; H04L 2012/40273
USPC .......................... 370/389; 375/219; 700/7, 19
See application file for complete search history.

(56) References Cited

U.S. PATENT DOCUMENTS

| 7,047,117 B2 * | 5/2006 | Akiyama et al. ................. 701/48 |
| 2011/0245934 A1 * | 10/2011 | Yasuda ........................... 700/19 |
| 2012/0078383 A1 * | 3/2012 | Takahashi ........................ 700/7 |
| 2012/0083902 A1 * | 4/2012 | Daum et al. ..................... 700/3 |

FOREIGN PATENT DOCUMENTS

| JP | A-2004-362067 | 12/2004 |
| JP | A-2007-195040 | 8/2007 |
| JP | A-2009-118113 | 5/2009 |
| JP | A-2009-253803 | 10/2009 |
| JP | A-2011-40886 | 2/2011 |
| JP | A-2011-109452 | 6/2011 |

OTHER PUBLICATIONS

Aug. 26, 2014 Office Action issued in Japanese Patent Application No. 2011-065652 (with partial translation.).

* cited by examiner

*Primary Examiner* — Un C Cho
*Assistant Examiner* — Fangyan Deng
(74) *Attorney, Agent, or Firm* — Oliff PLC

(57) ABSTRACT

A data storage processor of an HV-ECU transmits frame data including ID information indicating a kind of data and data information indicating the contents of the data to a motor ECU. When the motor ECU receives the frame data from the HV-ECU, a calculation processor of the motor ECU determines that the data information of the received frame data is data regarding the kind of data indicated by the ID information of the received frame data and executes a predetermined calculating process based on the data information. When the ID information of the frame data received from the HV-ECU is a synchronization ID, a data storage processor of the motor ECU starts a process of transmitting, to the HV-ECU, the frame data to be transmitted within the communication period.

6 Claims, 8 Drawing Sheets

COMMUNICATION SYSTEM AND COMMUNICATION APPARATUS

CROSS-REFERENCE TO RELATED APPLICATIONS

This application is based upon and claims the benefit of priority of the prior Japanese Patent Application No. 2011-065652, filed on Mar. 24, 2011, the entire contents of which are incorporated herein by reference.

BACKGROUND OF THE INVENTION

1. Field of the Invention

The present invention relates to a communication system and a communication apparatus capable of communicating with a communication apparatus.

2. Description of the Related Art

Conventionally, a CAN (controller area network) communication scheme has been known as a communication scheme between electronic control units such as an ECU (engine electronic control unit) and a motor ECU. According to the CAN communication scheme, various commands or control signals are transmitted between the electronic control units via a communication line called a CAN bus. The CAN communication scheme has widely been used as a communication scheme which is low in cost and is high in the degree of freedom.

In the CAN communication scheme, a master-slave relation is not determined, and instead a so-called multi-master system in which each electronic control unit transmits data at any communication timing has been employed.

Further, as one of communication schemes, there is a known single master system in which communication apparatuses communicate with each other using a master-slave relation. According to the single master system, one of electronic control units in a network serves as a master node and manages a communication schedule, and another electronic control unit (slave node) transmits data in response to a request from the master node.

For example, in a technique disclosed in Japanese Patent Application Laid-Open No. 2004-362067, a master node initially transmits transmission destination slave node information when the master node transmits data to a specific slave node. When it is determined that the destination node information is information destined for the own apparatus with reference to the transmission destination slave node information, each slave node executes a predetermined calculating process based on subsequently transmitted data and transmits the calculation result to the master node.

In the technique disclosed in Japanese Patent Application Laid-Open No. 2004-362067, however, there is some room for further improvement in efficiency of data communication. In the technique disclosed in Japanese Patent Application Laid-Open No. 2004-362067, for example, the transmission destination slave node information is transmitted separate from calculation processing data. Therefore, the amount of data increases by the amount of the transmitted transmission destination slave node information, and therefore the efficiency of data communication is lowered.

When the efficiency of the data communication is lowered, the transmission and reception of data may not be completed within a control period particularly when the data is repeatedly transmitted and received at a predetermined control period between the master and slave nodes.

One aspect of an embodiment is aimed to provide a communication system and communication apparatus that can improve the efficiency of the data communication.

SUMMARY OF THE INVENTION

A communication system according to an embodiment is a first communication apparatus transmits/receives data to/from a second communication apparatus at a predetermined communication period. The first communication apparatus includes a first control means configured to transmit, to the second communication apparatus, frame data including ID information indicating a kind of data and data information indicating a content of the data. The second communication apparatus includes a second control means configured to determine that data information included in received frame data is data regarding a kind of data of ID information included in received frame data when the frame data is received from the first communication apparatus and executes a predetermined calculating process using the data information. When the ID information of the frame data received from the first communication apparatus is a predetermined ID, the second control means executes the calculating process using the data information of the received frame data and starts a transmitting process of transmitting frame data to be transmitted within the communication period to the first communication apparatus.

The communication system disclosed in the present application is capable of improving the efficiency of the data communication.

BRIEF DESCRIPTION OF THE DRAWINGS

The understanding of the present invention and the advantages obtained from the understanding will be apparent with ease, referring to the description of an exemplary detailed embodiment of the invention and the accompanying drawings.

DETAILED DESCRIPTION OF THE PREFERRED EMBODIMENTS

Figure 1:
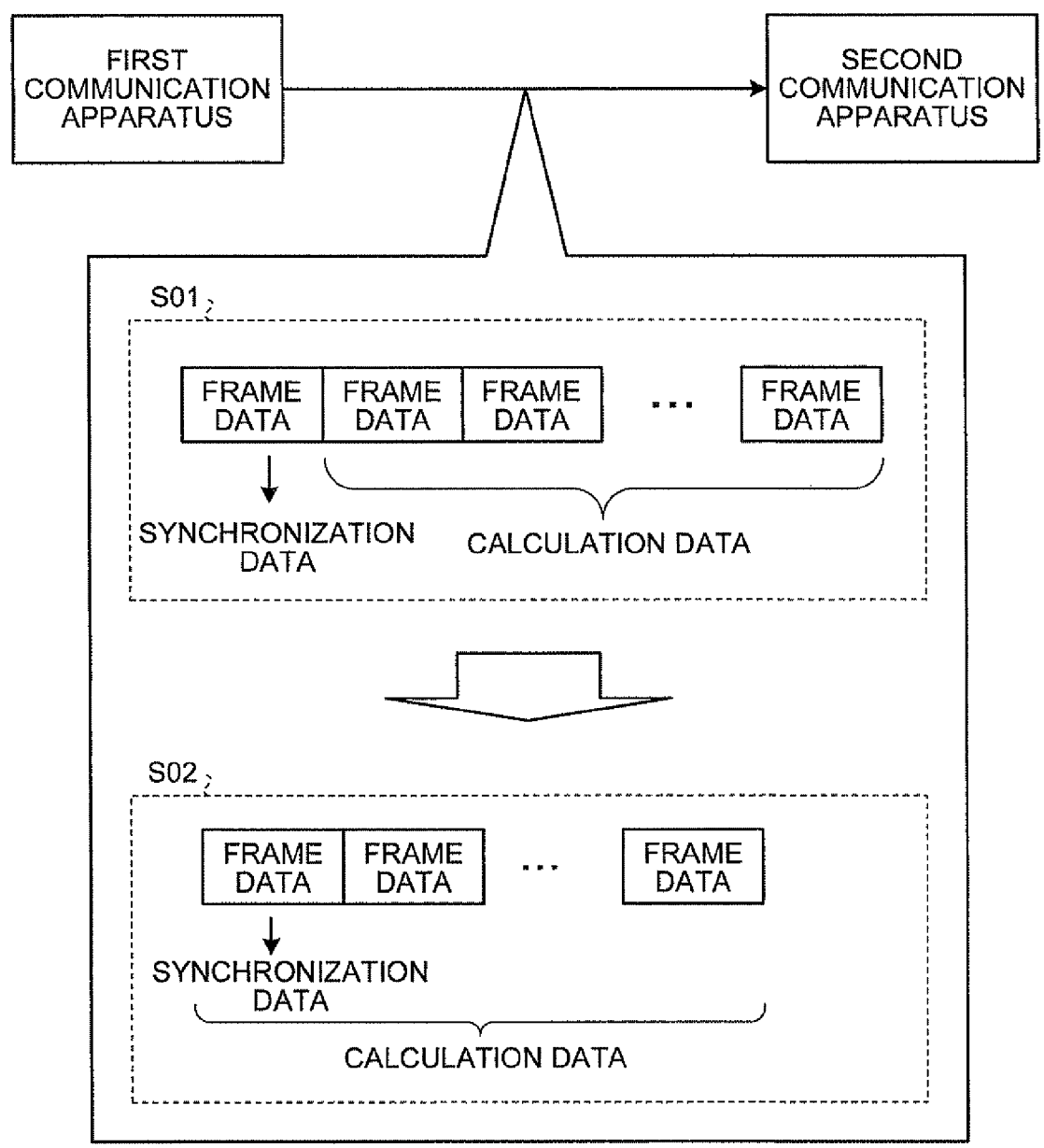
FIG. 1 is a diagram illustrating a communication method according to the invention.

Hereinafter, a communication system and a communication apparatus will be described in detail with reference to the accompanying drawings according to an exemplary embodiment of the invention. First, a communication method according to the invention will be described with reference to FIG. 1. FIG. 1 is a diagram illustrating the communication method according to the invention.

According to the communication method according to the invention, as illustrated in FIG. 1, first and second communication apparatuses transmit and receive data to and from each other in a predetermined communication period. Specifically, the first communication apparatus serves as a mater node and manages a schedule of the communication with the second communication apparatus. The second communication apparatus serves as a slave node and transmits data in response to an instruction from the first communication apparatus serving as the master node.

More specifically, in the communication method according to the invention, the first communication apparatus transmits synchronization data to the second communication apparatus. Then, when the second communication apparatus receives the synchronization data, the second communication apparatus starts a process of transmitting data to be transmitted within a communication period.

Here, the synchronization data refers to frame data that includes a predetermined ID (hereinafter, referred to as a "synchronization ID") indicating the start of the communication period. Further, the frame data includes at least ID information indicating a kind of data and data information indicating the contents of the data.

When the second communication apparatus receives the frame data from the first communication apparatus, the second communication apparatus reads the ID included in the received frame data. When the read ID is the synchronization ID, the second communication apparatus starts transmitting the frame data to be transmitted within the communication period.

The second communication apparatus executes a predetermined calculating process based on the frame data transmitted from the first communication apparatus. Specifically, when the second communication apparatus receives the frame data from the first communication apparatus, the second communication apparatus determines that the data information included in the received frame data is data regarding the kind of data indicated by the ID information of the received frame data and executes a predetermined calculating process based on the data information.

When the synchronization data is separated from the frame data (hereinafter, referred to as "calculation data") for a calculation process, as illustrated in step S01 of FIG. 1, the amount of data increases to the extent that the synchronization data is transmitted, and therefore the efficiency of data communication deteriorates. When the efficiency of data communication deteriorates, there is a high probability that the transmission and the reception of the frame data may not to be completed, and therefore the undesirable result may be caused.

For this reason, in the communication method according to the invention, as illustrated in step S02 of FIG. 1, the synchronization data is configured to be used as the calculation data. That is, in the communication method according to the invention, the synchronization ID of the synchronization data is used as information indicating start of the transmitting process and the data information of the synchronization data is used as the calculation data.

Thus, in the communication method according to the invention, the first communication apparatus transmits the frame data, which includes the ID information indicating a kind of data and the data information indicating the contents of the data, to the second communication apparatus. Further, in the communication method according to the invention, when the second communication apparatus receives the frame data from the first communication apparatus, the second communication apparatus determines that the kind of data indicated by the ID information of the received frame data is data regarding the kind of data. Then, the second communication apparatus executes a predetermined calculating process.

Further, when the ID information of the frame data received from the first communication apparatus is the synchronization ID, the second communication apparatus executes the calculating process based on the data information of the received frame data and starts transmitting the frame data to be transmitted within the communication period to the first communication apparatus.

Accordingly, since the amount of frame data to be transmitted from the first communication apparatus to the second communication apparatus is further reduced, compared to the case where the synchronization data is separated from the calculation data, the data communication can be efficiently executed.

Meanwhile, there is a concern that the synchronization data is transmitted a plurality of times within one communication period since garbled data or the like occurs in the data transmitted from the first communication apparatus. In this case, whenever the second communication apparatus receives the synchronization data, the second communication apparatus resumes the transmission of the frame data to be transmitted within the communication period.

When the transmission of the frame data is resumed a plurality of times within one communication period, there is a concern that data to be transmitted to the first communication apparatus may not be all transmitted within the communication period. Further, even when the frame data can be all transmitted within one communication period, there is a concern that the same kind of frame data is transmitted a plurality of times within the communication period. Therefore, a problem may arise in a process of the first communication apparatus, and therefore the undesirable result may be caused.

Accordingly, in the communication method according to the invention, when a predetermined condition is not satisfied, the transmitting process is configured not to be started even when the synchronization data is received. Thus, the second communication apparatus can be prevented from starting the transmitting process at an inappropriate timing, which will be described later.

Hereinafter, the configurations and operations of a communication system and a communication apparatus executing the communication method according to the invention will be described in detail. In an exemplary embodiment described below, a communication system between in-vehicle ECUs will be described as an example of the communication system. However, the invention is not limited thereto, but the communication method according to the invention may be applied to a communication system in which communication is executed among different communication apparatuses.

Further, an example will be described in which an HV-ECU (Hybrid Vehicle-ECU) controlling a power train system ECU is used as an example of the first communication apparatus and one motor ECU of the power train system ECU is used as an example of the second communication apparatus.

Figure 2:
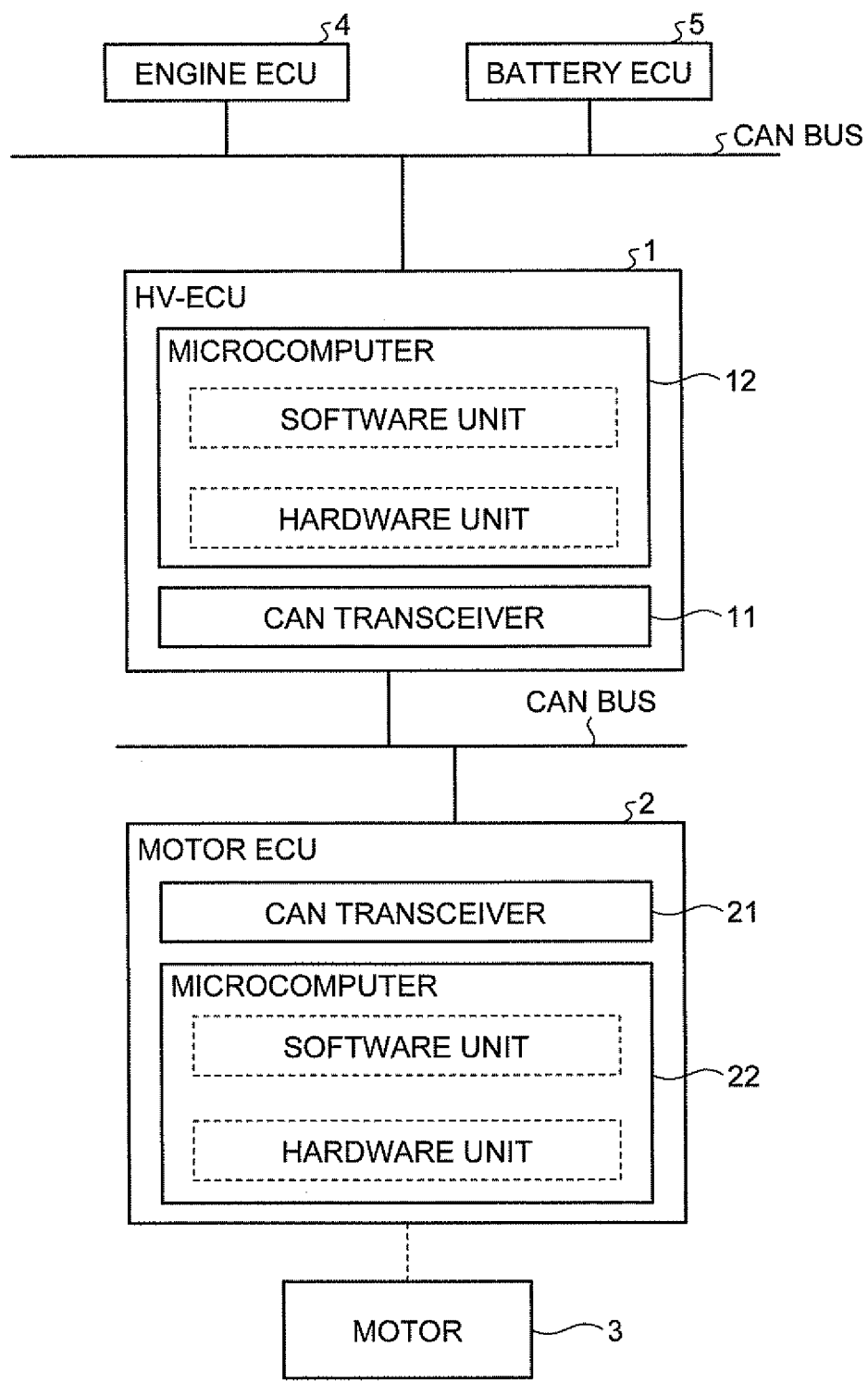
FIG. 2 is a diagram illustrating an example of the configuration of a communication system according to an exemplary embodiment.

First, an example of the configuration of the communication system according to the exemplary embodiment will be described with reference to FIG. 2. FIG. 2 is a diagram illustrating an example of the configuration of the communication system according to the exemplary embodiment.

In the communication system according to the exemplary embodiment, as illustrated in FIG. 2, an HV-ECU 1 and a motor ECU 2 are connected to each other via a CAN bus. The CAN bus is a two-line type communication line which includes a CAN_Hi line and a CAN_Lo line. A motor 3 is connected to the motor ECU 2.

In the communication system, the HV-ECU 1 serving as a master node, as a whole, controls the motor 3, an engine, and the like in cooperation with various ECUs such as the motor ECU 2 installed in a vehicle. The motor ECU 2 serving as a slave node executes a specific control of the motor 3 in response to a command from the HV-ECU 1.

For example, the HV-ECU 1 transmits a torque instruction value of the motor 3 to the motor ECU 2 via the CAN bus. When the motor ECU 2 receives the torque instruction value from the HV-ECU 1 via the CAN bus, the motor ECU 2 controls the motor 3 based on the received torque instruction value. The motor ECU 2 transmits the control result of the motor 3 to the HV-ECU 1. The series of processes is executed within a predetermined communication period.

The HV-ECU 1 includes a CAN transceiver 11 and a microcomputer 12. Likewise, the motor ECU 2 includes a CAN transceiver 21 and a microcomputer 22. Here, hardware for CAN communication is used as the CAN transceivers 11 and 21, the hardware units of the microcomputers 12 and 22, and the CAN bus. That is, the communication system according to the exemplary embodiment can be realized at low cost, like the CAN communication.

As illustrated in FIG. 2, the HV-ECU 1 is connected not only to the CAN bus, which connects the HV-ECU 1 to the motor ECU 2, but also to a bus (for example, a CAN bus) which connects the HV-ECU 1 to various ECUs, such as an engine ECU 4 or a battery ECU 5, installed in a vehicle.

As illustrated in FIG. 2, only the HV-ECU 1 and the motor ECU 2 are connected to the CAN bus which connects the HV-ECU 1 to the motor ECU 2. However, three or more communication apparatuses (ECU) may be connected to the CAN bus.

Figure 3:
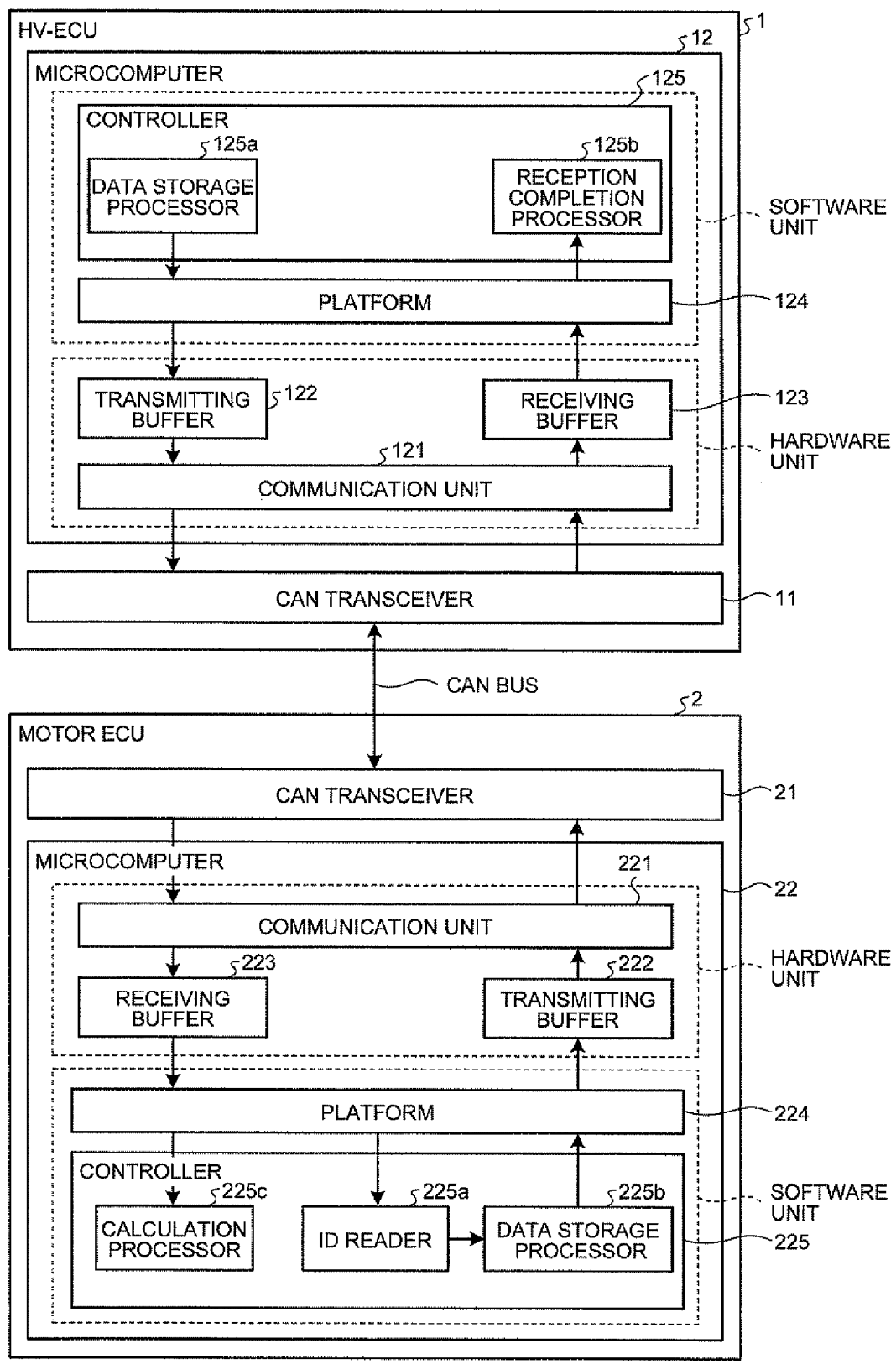
FIG. 3 is a block diagram illustrating the configurations of an HV-ECU and a motor ECU.

Next, the configurations of the HV-ECU 1 and the motor ECU 2 will be described with reference to FIG. 3. In FIG. 3, only necessary constituent elements are illustrated to describe the properties of the HV-ECU 1 and the motor ECU 2 and the other general constituent elements are not illustrated.

As illustrated in FIG. 3, the HV-ECU 1 includes the CAN transceiver 11 and the microcomputer 12. The microcomputer 12 includes a communication unit 121, a transmitting buffer 122, a receiving buffer 123, a platform 124, and a controller 125. The controller 125 includes a data storage processor 125a and a reception completion processor 125b.

The motor ECU 2 includes the CAN transceiver 21 and the microcomputer 22. The microcomputer 22 includes a communication unit 221, a transmitting buffer 222, a receiving buffer 223, a platform 224, and a controller 225. The controller 225 includes an ID reader 225a, a data storage processor 225b, and a calculation processor 225c.

First, the configuration of the HV-ECU 1 will be described. The CAN transceiver 11 is an interface IC (Integrated Circuit) between the microcomputer 12 and the CAN bus. Specifically, the CAN transceiver 11 outputs the frame data generated by the microcomputer 12 to the CAN bus and outputs data input from the CAN bus to the microcomputer 12.

The microcomputer 12 is a microcomputer that controls communication between the HV-ECU 1 and the motor ECU 2 in conformity with a CAN protocol. Here, in the microcomputer 12, the communication unit 121, the transmitting buffer 122, and the receiving buffer 123 are hardware units, and the platform 124 and the controller 125 are software units.

The communication unit 121 is a hardware unit that transmits or receives the frame data in conformity with the CAN protocol. Specifically, when the frame data is stored in the transmitting buffer 122, the communication unit 121 outputs the frame data stored in the transmitting buffer 122 to the CAN bus via the CAN transceiver 11 in conformity with the CAN protocol.

Specifically, when the communication unit 121 outputs the frame data to the CAN bus, the communication unit 121 confirms a use state of the CAN bus. When the CAN bus is not used, the communication unit 121 outputs the frame data to the CAN bus. When there is competition in the CAN bus, the communication unit 121 compares the priority of the frame data to be transmitted by a communication partner (here, the motor ECU 2) to the priority of the frame data to be transmitted by the HV-ECU 1. When the priority of the frame data to be transmitted by the HV-ECU 1 is higher, the communication unit 121 outputs the frame data to the CAN bus earlier than the communication partner.

On the contrary, when the priority of the frame data to be transmitted by the communication partner is higher, the communication unit 121 first outputs the frame data of the communication partner and then outputs the frame data to the CAN bus after the CAN bus is empty. This process is referred to as "communication adjustment."

When the communication unit 121 receives the frame data from the CAN transceiver 11, the communication unit 121 stores the received frame data in the receiving buffer 123.

The transmitting buffer 122 is a hardware unit that temporarily stores the frame data to be transmitted to another ECU (here, the motor ECU 2). Further, the receiving buffer 123 is a hardware unit that temporarily stores the frame data received from another ECU (here, the motor ECU 2).

A CAN transceiver, a communication unit, a transmitting buffer, and a receiving buffer used in the conventional CAN communication can be used as the CAN transceiver 11, the communication unit 121, the transmitting buffer 122, and the receiving buffer 123, but the invention is not limited thereto. That is, a transceiver, a communication unit, a transmitting buffer, and a receiving buffer may be used only for the communication system according to the exemplary embodiment.

The platform 124 serves as a processor that delivers the frame data generated by the controller 125 which is a software unit to the transmitting buffer 122 which is a hardware unit. The platform 124 also serves as a processor that delivers the frame data received from the receiving buffer 123, which is the hardware unit, to the controller 125 which is the software unit.

The controller 125 is, for example, a CPU (Central Processing Unit) and is a software unit that executes processes associated with the communication between the HV-ECU 1 and the motor ECU 2. In particular, the controller 125 includes the data storage processor 125a and the reception completion processor 125b.

The data storage processor 125a is a processor that stores the frame data to be transmitted to the motor ECU 2 in the transmitting buffer 122 via the platform 124. Specifically, the data storage processor 125a divides all of the frame data to be transmitted to the motor ECU 2 into predetermined blocks (for example, every four frames) and stores each of the frame data of the divided data in the transmitting buffer 122 in each communication processing period.

The frame configuration of the frame data transmitted and received between the HV-ECU 1 and the motor ECU 2 will be described. Each frame data includes data information of 0 to 8 bytes indicating the contents of the data. Each frame data further includes ID information. For example, the ID information is information expressed by 11 bits and indicates a kind of data and a priority. In the exemplary embodiment, a specific ID of the ID information is used as synchronization ID. Further, each frame data further includes a SUM value used for SUM check or the like.

The reception completion processor 125b is a processor that executes a reception completing process when receiving the final frame data from the motor ECU 2 within the predetermined communication period. For example, when the reception completion processor 125b receives the final frame data from the motor ECU 2, the reception completion processor 125b executes the SUM check to determine whether to normally receive all of the frame data from the motor ECU 2.

In FIG. 3, only the data storage processor 125a and the reception completion processor 125b are illustrated as the processors of the controller 125. The controller 125 may include another processor such as a calculation processor that executes a predetermined calculating process based on the frame data received from the motor ECU 2.

Next, the configuration of the motor ECU 2 will be described. Further, since the hardware units of the motor ECU 2, specifically, the CAN transceiver unit 21, the communication unit 221, the transmitting buffer 222, and the receiving buffer 223 which are the hardware units have the same configurations as the hardware units of the HV-ECU 1, the description thereof will not be repeated. Since the platform 224 is the same processor as the platform 124 of the HV-ECU 1, the description thereof will not be repeated.

The controller 225 of the motor ECU 2 is, for example, a CPU and is a software unit that executes processes associated with the communication between the HV-ECU 1 and the motor ECU 2. The controller 225 includes an ID reader 225a, a data storage processor 225b, and a calculation processor 225c.

The ID reader 225a is a processor that reads the ID of the frame data stored in the receiving buffer 223 and delivers the synchronization ID to the data storage processor 225b when the read ID is the synchronization ID. Here, an ID used as the synchronization ID is determined in advance.

The data storage processor 225b is a processor that executes a transmitting process of storing the frame data to be transmitted to the HV-ECU 1 in the transmitting buffer 222 via the platform 224. When the data storage processor 225b receives the synchronization ID from the ID reader 225a, the data storage processor 225b starts the transmitting process. Specifically, the data storage processor 225b stores the frame data corresponding to the synchronization ID, that is, the frame data to be transmitted within the predetermined communication period in the transmitting buffer 222 for each predetermined block.

In this way, the motor ECU 2 serving as the slave node starts the process of transmitting the frame data to be transmitted within the communication period, when the motor ECU 2 receives the frame data (synchronization data) including the synchronization ID from the HV-ECU 1 serving as the master node.

That is, the motor ECU 2 grasps a start timing of the communication period when the motor ECU 2 receives the synchronization data from the HV-ECU 1. When the motor ECU 2 starts transmitting the data to be transmitted to the HV-ECU 1 at the start timing, the motor ECU 2 can reliably complete the transmission of the data to be transmitted to the HV-ECU 1 within the communication period.

The calculation processor 225c is a processor that executes a predetermined calculating process using the frame data received from the HV-ECU 1 within the communication period, that is, the plurality of frame data including the synchronization data. For example, when the calculation processor 225c receives the torque instruction value from the HV-ECU 1, the calculation processor 225c calculates a control amount of the motor 3 based on the received torque instruction value.

In this way, the calculation processor 225c executes the predetermined calculating process using the plurality of frame data including the synchronization data as calculation data. Accordingly, since the amount of frame data is further reduced, compared to the case where the synchronization data is separated from the calculation data, the data communication can be efficiently executed. When the efficiency of the data communication is improved, it is possible to reduce a probability that the data to be transmitted to the HV-ECU 1 may not be all transmitted within the communication period, and therefore the reliability of the data communication can be improved.

Figure 4:
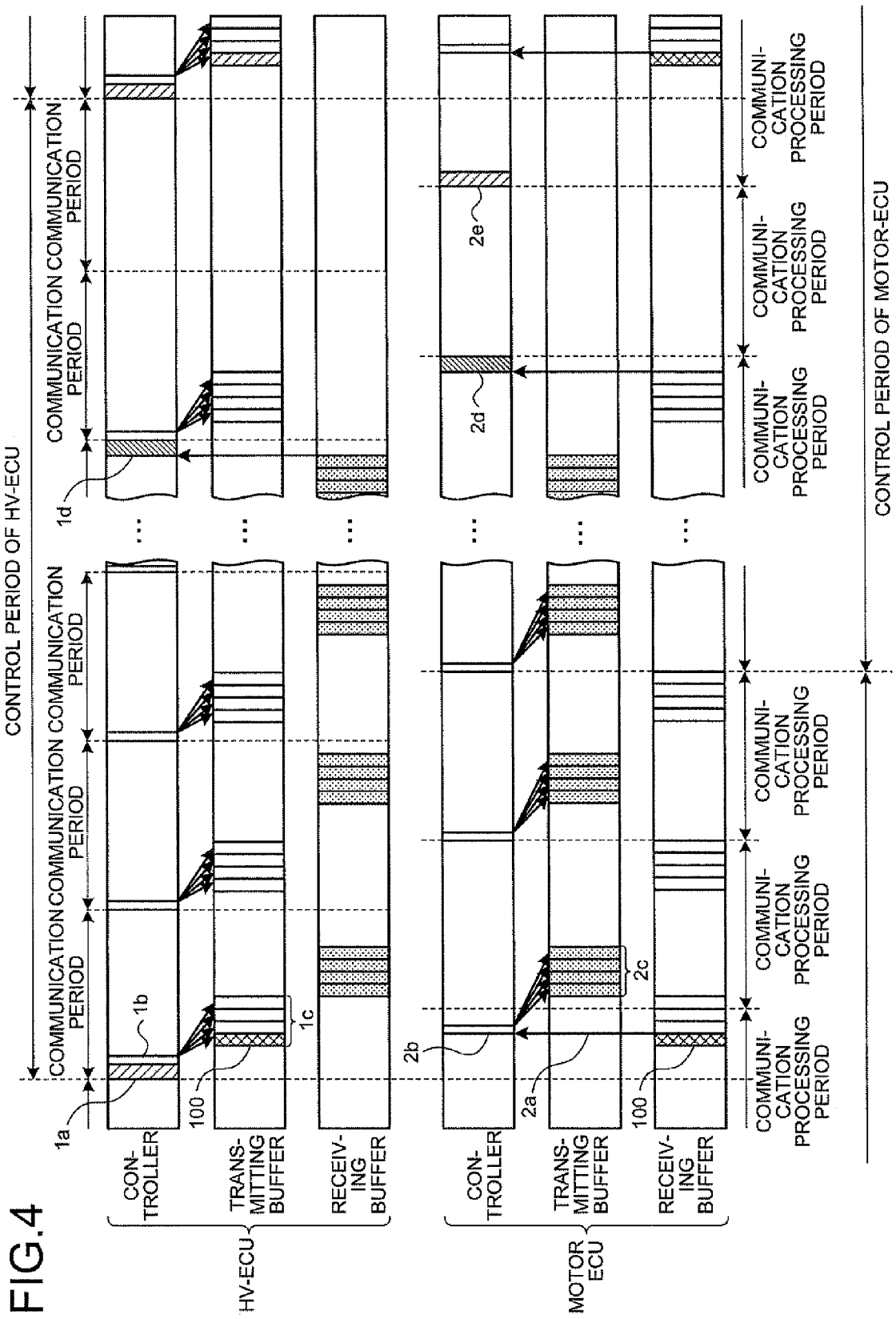
FIG. 4 is a timing chart illustrating an example of a communication timing in a predetermined communication period between the HV-ECU and the motor ECU.

Hereinafter, a communication timing between the HV-ECU 1 and the motor ECU 2 in the predetermined communication period will be described with reference to FIG. 4. FIG. 4 is a timing chart illustrating an example of the communication timing between the HV-ECU 1 and the motor ECU 2 in the predetermined communication period.

Here, in FIG. 4, it is assumed that the communication processing periods of the HV-ECU 1 and the motor ECU 2 are each 1 ms and the communication period is 8 ms which is the length of the communication processing period corresponding to eight times of the communication period. FIG. 4 shows an example in which synchronization of the start and end timings of the control period is not achieved between the HV-ECU 1 and the motor ECU 2 and only the lengths of the communication processing period and the control period are the same as each other.

The "control period" refers to a processing period of a predetermined control process executed by the first communication apparatus. Here, the "control period" is a period in which the communication process executed between the first and second communication apparatuses is completed in the predetermined control process. The "communication processing period" refers to a processing period in which a process is executed for communication within the communication period. Hereinafter, an example will be described in which the control period and the communication period are the same as each other. However, the lengths or the start timings of the control period may be different from those of the communication period.

As illustrated in FIG. 4, in each communication period, the controller 125 of the HV-ECU 1 executes a process of acquiring and latching (retaining) the frame data acquired in the previous communication period or a process of calculating the SUM value of data desired to be transmitted in the current communication period (see "1a" in FIG. 4). Here, the SUM value is a value obtained by adding all of the values when information (the ID, the data, or the like) other than the SUM value of each frame data is information represented in binary numbers of 0 and 1. The calculated Sum value is added to each frame data.

After completing this process, the controller 125 of the HV-ECU 1 stores the initially divided data among the divided data of the data transmitted to the motor ECU 2 in the transmitting buffer 122 (see "1b" in FIG. 4).

Frame data 100 at the head of the divided data includes the synchronization ID. That is, the HV-ECU 1 initially transmits the synchronization data among the frame data to be transmitted within the communication period. Thus, since the motor ECU 2 can start transmitting the frame data to be transmitted within the communication period in an early stage of the communication period, it is possible to reliably prevent the data to be transmitted to the HV-ECU 1 from not being all transmitted within the communication period.

When the divided data is stored in the transmitting buffer 122 of the HV-ECU 1, the communication unit 121 of the HV-ECU 1 outputs the divided data stored in the transmitting buffer 122 to the CAN bus (see "1*c*" in FIG. 4). The divided data output to the CAN bus is input to the communication unit 221 of the motor ECU 2 and is stored in the receiving buffer 223 by the communication unit 221.

In the HV-ECU 1, the controller 125 sequentially stores the remaining divided data in the transmitting buffer 122 in each communication processing period and the communication unit 121 sequentially outputs the frame data stored in the transmitting buffer 122 in conformity with the CAN protocol.

When the current control period starts, the HV-ECU 1 executes a process of calculating the amount of torque (torque instruction value) to be output by a motor or an engine based on information on a motor state such as the number of motor rotations transmitted from the motor ECU 2 in the previous control period (communication period) or various kinds of information on a stepped state (amount of torque desired by a driver) of an accelerator of a driver and vehicle control of a battery charge state or the like transmitted from other buses.

When the divided data is stored in the receiving buffer 223, the controller 225 of the motor ECU 2 generates a reception interruption and reads the ID of the divided data stored in the receiving buffer 223 (see "2*a*" in FIG. 4). At this time, when the synchronization ID is included in the read ID, the controller 225 of the motor ECU 2 starts transmitting the frame data to be transmitted within the communication period (the control period of the HV-ECU 1). Specifically, the controller 225 divides the data corresponding to the synchronization ID into predetermined blocks and starts storing each of the divided data in the transmitting buffer 222 in each communication processing period (see "2*b*" in FIG. 4).

When the divided data is stored in the transmitting buffer 222, the communication unit 221 of the motor ECU 2 outputs the divided data stored in the transmitting buffer 222 to the CAN bus (see "2*c*" in FIG. 4). The divided data output to the CAN bus is input into the communication unit 121 of the HV-ECU 1 and is stored in the receiving buffer 123 by the communication unit 121.

In the motor ECU 2, the controller 225 sequentially stores the remaining divided data in the transmitting buffer 222 in each communication processing period and the communication unit 221 sequentially outputs the frame data stored in the transmitting buffer 222 in conformity with the CAN protocol.

When the motor ECU 2 receives the synchronization ID from the HV-ECU 1, the motor ECU 2 starts storing, in the transmitting buffer 222, the information on the motor state (the motor state after the motor is controlled based on the torque instruction value or the like transmitted from the HV-ECU 1 in the previous communication period) such as the acquired current number of motor rotations or the data to be transmitted to the HV-ECU 1 among the calculation results of the motor ECU 2 in the previous control period.

On the other hand, when the HV-ECU 1 receives the final frame data among the frame data to be received within the communication period from the motor ECU 2, the controller 125 of the HV-ECU 1 executes the reception completing process (see "1*d*" in FIG. 4). Specifically, in the HV-ECU 1, the reception completion processor 125*b* executes SUM check to determine whether the SUM value is normal by calculating the SUM value of the frame data received within the communication period and comparing the calculated SUM value to the SUM value transmitted from the motor ECU 2.

Here, the example has hitherto been described in which the SUM check of all the frame data received within one communication period is collectively executed. However, the invention is not limited thereto, but the SUM check may be executed whenever the frame data is received.

Likewise, when the motor ECU 2 receives the final frame data among the frame data to be received within the communication period from the HV-ECU 1, the controller 225 of the motor ECU 2 executes the reception completing process (see "2*d*" in FIG. 4).

The data storage processor 225*b* of the motor ECU 2 executes a process of acquiring and latching (retaining) all of the frame data to be transmitted within the subsequent communication period at an arbitrary timing in the communication period or a process of calculating the SUM value of the latched data (see "2*e*" in FIG. 4).

That is, the data storage processor 225*b* acquires all of the frame data to be transmitted within a communication period before this communication period, and then starts transmitting the acquired frame data when receiving the synchronization data from the HV-ECU 1.

The timing at which the data storage processor 225*b* executes the latching process is preferably any timing during a period in which the transmission of all the frame data to be transmitted in the previous communication period is completed and the transmission in the subsequent communication period is then started. For example, the timing at which the data storage processor 225*b* executes the latching process is the timing at which the transmission of the final data to be transmitted within the communication period is completed, or the timing at which a control process (the control period of the motor ECU 1) executed periodically by the motor ECU 2 is started or ended.

In the communication system according to the exemplary embodiment, the synchronization ID is transmitted once when the communication period starts. However, for example, when garbled data or the like occurs in the data transmitted from the HV-ECU 1, there is a concern that the frame data including the synchronization ID is transmitted a plurality of times within the communication period.

In this case, whenever receiving the synchronization ID, the motor ECU 2 may resume the process of transmitting the frame data to be transmitted within the communication period. As a result, there is a concern that the data to be transmitted to the HV-ECU 1 may not be all transmitted within the communication period.

Accordingly, in the communication system according to the exemplary embodiment, the motor ECU 2 does not resume the transmitting process even when receiving the synchronization ID, when a predetermined condition is not satisfied. Hereinafter, countermeasure examples will be described when the synchronization data is transmitted a plurality of times within a communication period.

Figure 5:
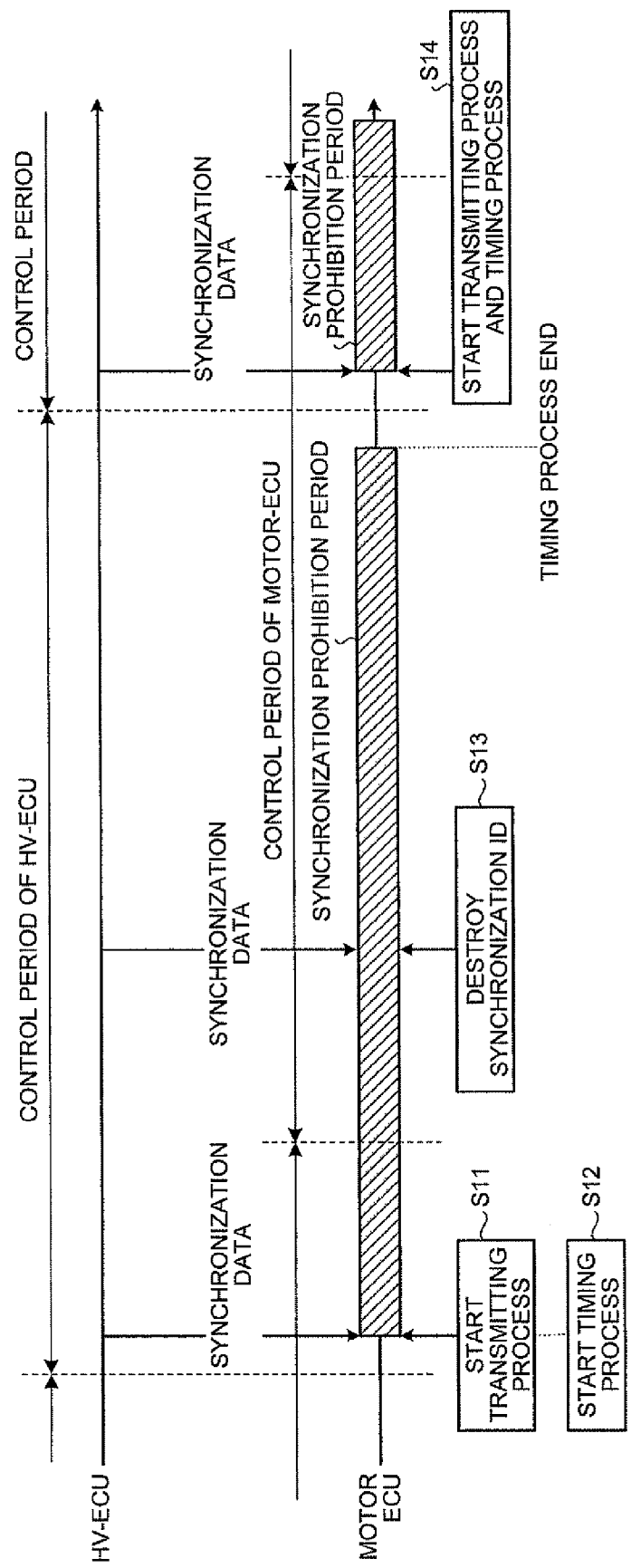
FIG. 5 is a diagram illustrating a countermeasure example (first countermeasure) when synchronization data is transmitted a plurality of times within the communication period.

FIG. 5 is a diagram illustrating a countermeasure example (first countermeasure) when the synchronization data is transmitted a plurality of times within a communication period. FIG. 5 shows an example in which the synchronization data is normally transmitted at the start time of each communication period, but synchronization data in which an ID other than the synchronization ID is garbled in the synchronization ID is abnormally transmitted during the communication period.

As illustrated in FIG. 5, when the motor ECU 2 receives the synchronization data and then receives the synchronization data again until a predetermined time is elapsed, the motor ECU 2 may not start the transmitting process.

Specifically, when the data storage processor 225b of the motor ECU 2 receives the synchronization data from the HV-ECU 1, the data storage processor 225b starts the transmitting process in step S11 of FIG. 5. Then, when the data storage processor 225b receives the synchronization data, the data storage processor 225b operates a timer measuring a predetermined time and starts a timing process of measuring the predetermined time using an internal clock in step S12 of FIG. 5.

The motor ECU 2 sets a period in which the timing process ends as a synchronization prohibition period. The motor ECU 2 does not start the transmitting process, even when the motor ECU 2 receives the synchronization data within the synchronization prohibition period.

Specifically, when the data storage processor 225b receives the synchronization ID from the ID reader 225a, the data storage processor 225b determines whether a predetermine condition (a condition in which the synchronization data is received and then the predetermined time is elapsed) is satisfied. When the predetermined condition is not satisfied, that is, the synchronization prohibition period is not elapsed, the data storage processor 225b destroys the synchronization ID received from the ID reader 225a in step S13 of FIG. 5. That is, the data storage processor 225b does not start the transmitting process.

In this way, the data storage processor 225b determines that the predetermined condition is not satisfied and thus does not start the transmitting process, until the synchronization data is received and the predetermined time is then elapsed.

Thus, the transmitting process is not started even when the motor ECU 2 receives the synchronization data at an inappropriate timing. Accordingly, it is possible to prevent the data to be transmitted to the HV-ECU 1 from not being all transmitted within the communication period since the motor ECU 2 resumes the transmitting process.

On the other hand, when the synchronization prohibition period ends, the data storage processor 225b starts the transmitting process and the timing process in step S14 of FIG. 5 when the synchronization data is received from the HV-ECU 1.

In FIG. 5, the predetermined time is set to an estimated time in which the communication period, in which the synchronization data is received, ends after the reception of the normally transmitted synchronization data. Specifically, the predetermined time is set to a time obtained by subtracting a time lag, in which the motor ECU 2 receives the synchronization data after the start of the communication period, from a time corresponding to one communication period.

Thus, it is possible to destroy the synchronization IDs of all the synchronization data abnormally transmitted until the communication period ends. That is, the transmitting process can be started only based on the normally transmitted synchronization data.

However, the predetermined time is not limited thereto. For example, the predetermined time may be determined in consideration of a time in which the transmission and reception of the frame data between the HV-ECU 1 and the motor ECU 2 are completed.

For example, in the example illustrated in FIG. 4, the communication period is 8 ms, and the transmission and reception of the frame data are completed in 7 ms. In this case, the predetermined time may be set so that the synchronization prohibition period ends in 7 ms. The existing time is used as the time necessary to transmit and receive the frame data.

Further, the predetermined time may be, for example, a time corresponding to one communication period.

Figure 6:
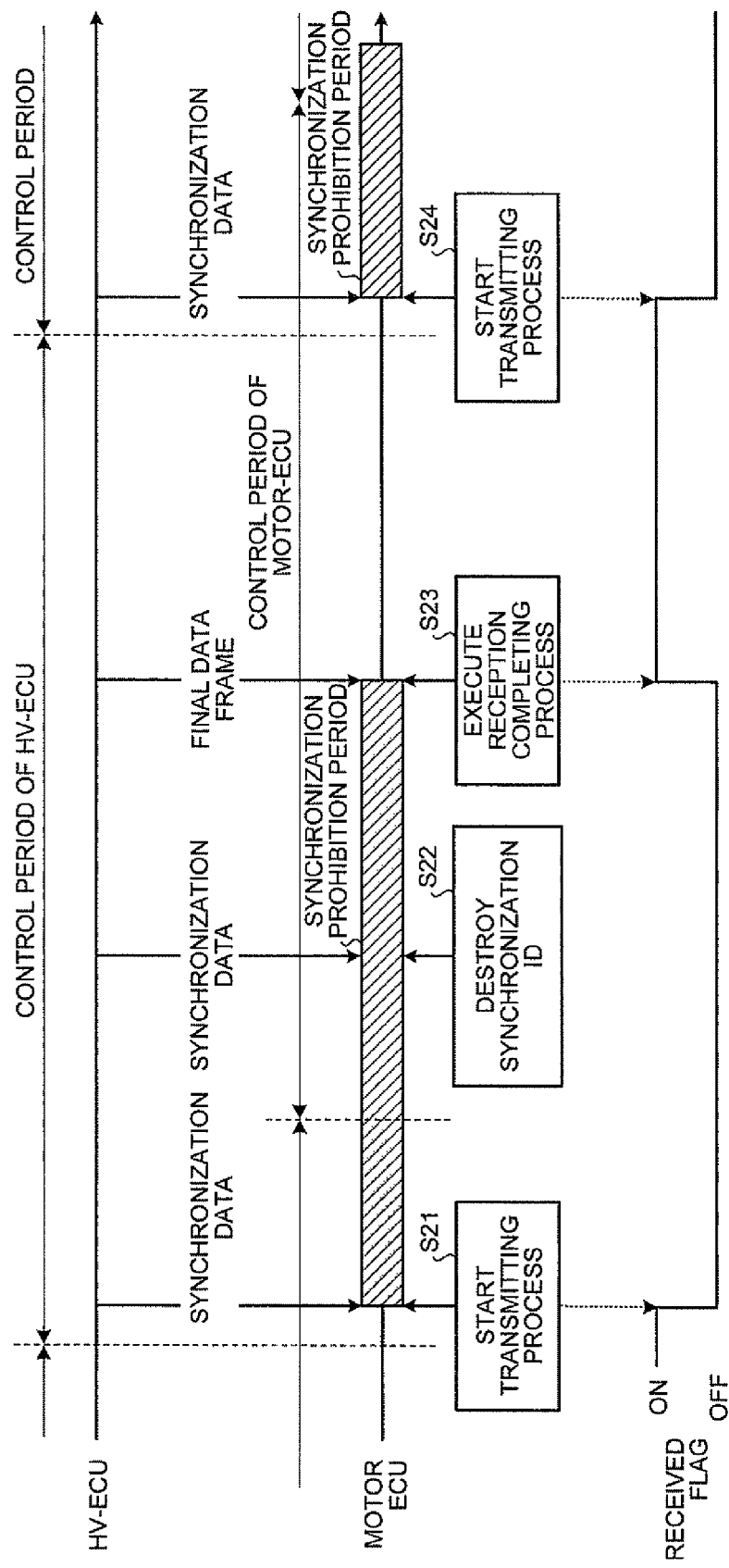
FIG. 6 is a diagram illustrating a countermeasure example (second countermeasure) when synchronization data is transmitted a plurality of times within the communication period.

The transmitting process may not be started, even when motor ECU 2 receives the synchronization data and then receives the synchronization data until completion of the transmission and reception of all frame data to be transmitted and received within the communication period. Hereinafter, this case will be described with reference to FIG. 6. FIG. 6 is a diagram illustrating a countermeasure example (second countermeasure) when the synchronization data is transmitted a plurality of times within a communication period.

As illustrated in FIG. 6, the motor ECU 2 determines a synchronization prohibition period depending on the state of a received flag indicating that the reception of the synchronization data is completed. Specifically, when the data storage processor 225b of the motor ECU 2 receives the synchronization data from the HV-ECU 1, the data storage processor 225b starts the transmitting process in step S21 of FIG. 6 and sets the state of the received flag to OFF.

When the data storage processor 225b receives the final frame data from the HV-ECU 1 in the communication period, the data storage processor 225b executes the reception completing process in step S22 of FIG. 6 and sets the state of the received flag to ON.

Here, before the motor ECU 2 receives the final frame data from the HV-ECU 1, the motor ECU 2 completely transmits all of the frame data to be transmitted to the HV-ECU 1. That is, when the motor ECU 2 completely transmits the data to the HV-ECU 1 and completely receives the data from the HV-ECU 1, the motor ECU 2 sets the state of the received flag to ON. When the motor ECU 2 completely receives the data from the HV-ECU 1 but does not completely transmit the data to the HV-ECU 1, the motor ECU 2 may set the state of the received flag to ON at the time of completely transmitting the data to the HV-ECU 1.

Even when the motor ECU 2 does not completely transmit the data to the HV-ECU 1, the motor ECU 2 may set the state of the received flag to ON at the time of completely receiving the data from the HV-ECU 1.

The data storage processor 225b sets a period in which the received flag is in an OFF state as a synchronization prohibition period. The data storage processor 225b does not start the transmitting process, even when the synchronization data is abnormally transmitted within the synchronization prohibition period.

Specifically, when the data storage processor 225b receives the synchronization ID from the ID reader 225a, the data storage processor 225b determines whether a predetermined condition (here, a condition in which the received flag is in an ON state) is satisfied. When the predetermined condition is not satisfied, that is, the received flag is in the OFF state, the synchronization ID received from the ID reader 225a is destroyed in step S23 of FIG. 6.

On the other hand, when the synchronization prohibition period ends, the data storage processor 225b starts the transmitting process in step S24 of FIG. 6 when receiving the synchronization data from the HV-ECU 1, and then sets the state of the received flag to OFF.

In this way, the data storage processor 225b determines that the predetermined condition is not satisfied, until the transmission and reception of all the frame data to be transmitted and received within the communication period are completed after the reception of the synchronization data. Even when the synchronization data is received, the transmitting process is not started.

Accordingly, it is possible to prevent the transmitting process from being start when the synchronization data is received again until the completion of the transmission and reception of the frame data within the communication period. As a result, it is possible to prevent the data to be transmitted to the HV-ECU 1 from not being all transmitted within the communication period since the motor ECU 2 resumes the transmitting process.

Here, the synchronization prohibition period is determined based on the flag (the received flag), but the invention is not limited thereto. Instead, the synchronization period may be determined based on a counter. That is, when the data storage processor 225b receives the synchronization data, the data storage processor 225b increases the counter. When the transmission and reception of the data within the communication period are completed, the counter is reset. Then, the data storage processor 225b may determine a period in which the counter increases as the synchronization prohibition period.

When the synchronization prohibition period ends earlier than the communication period, as illustrated in FIG. 6, the transmitting process is started based on the synchronization data even when the synchronization data is abnormally transmitted until the end of the synchronization prohibition period and the end of the communication period.

At this time, when the process of latching the frame data to be transmitted in the subsequent communication period is completed, the transmission start timing of the data from the motor ECU 2 is just advanced only by the communication period. Therefore, there is particularly no problem. However, when the process of latching the frame data to be transmitted in the subsequent communication period is not completed, the same data as the frame data transmitted in the current communication period are transmitted to the HV-ECU 1, and therefore the undesirable result may be caused.

Figure 7:
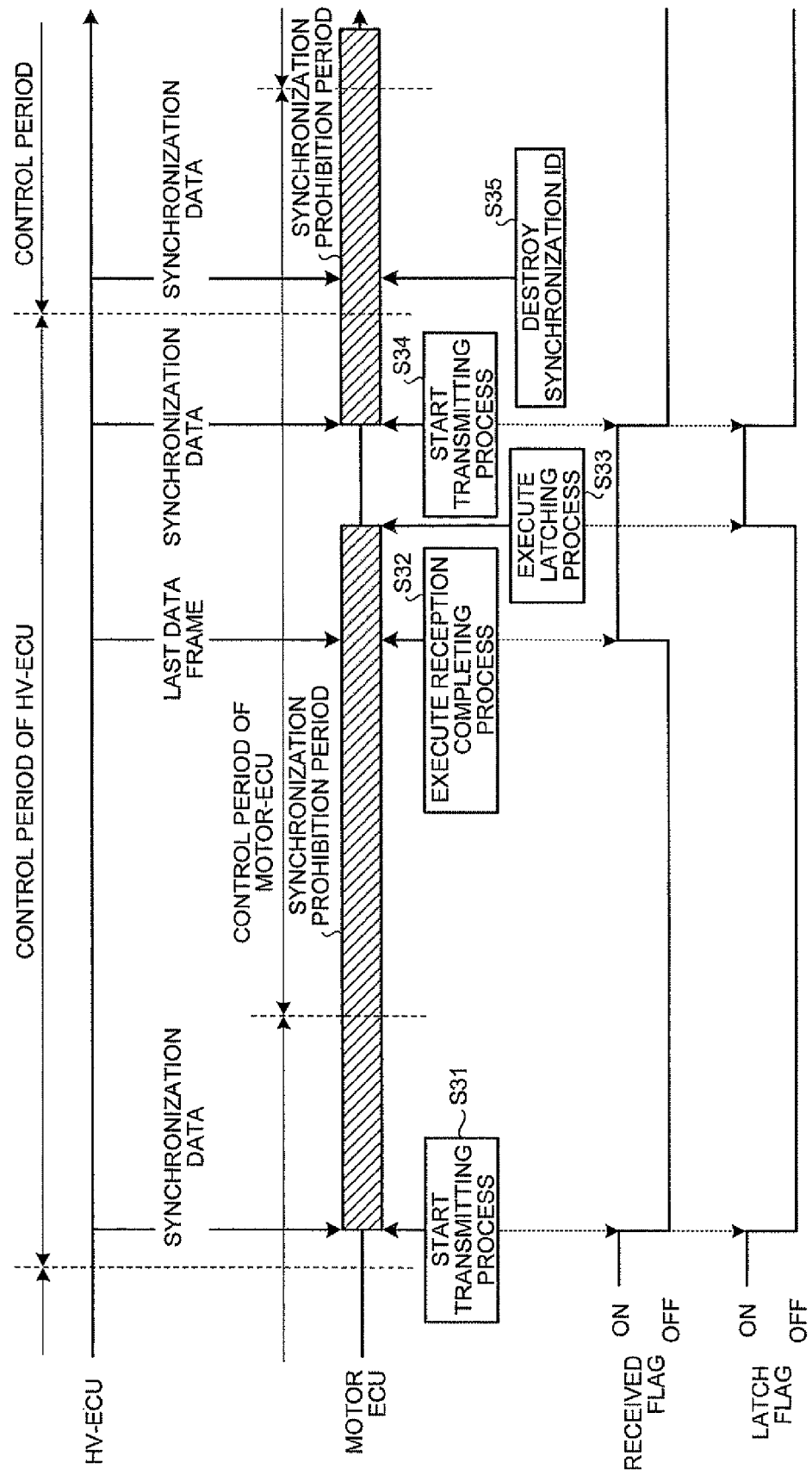
FIG. 7 is a diagram illustrating a countermeasure example (third countermeasure) when synchronization data is transmitted a plurality of times within the communication period.

Accordingly, the motor ECU 2 may determine the synchronization prohibition period by further considering whether the process of latching the frame data to be transmitted in the subsequent communication period is completed. Hereinafter, this case will be described with reference to FIG. 7. FIG. 7 is a diagram illustrating a countermeasure example (third countermeasure) when the synchronization data is transmitted a plurality of times within a communication period.

As illustrated in FIG. 7, the motor ECU 2 determines the synchronization prohibition period in consideration of not only the state of the received flag but also the state of a latch flag indicating that the latching process is completed. Specifically, when the motor ECU 2 receives the synchronization data from the HV-ECU 1, the data storage processor 225b starts the transmitting process in step S31 of FIG. 7. Further, when the motor ECU 2 receives the synchronization data, the data storage processor 225b sets the state of the received flag to OFF and sets the state of the latch flag to OFF.

When the motor ECU 2 receives the final frame data in the communication period from the HV-ECU 1, the data storage processor 225b executes a reception completing process in step S32 of FIG. 7 and sets the state of the received flag to ON. As in FIG. 6, the motor ECU 2 completely transmits all the data to be transmitted to the HV-ECU 1 before receiving the final frame data from the HV-ECU 1.

When the data storage processor 225b completes the latching process in step S33 of FIG. 7, the data storage processor 225b sets the state of the latch flag to ON. The data storage processor 225b sets, as the synchronization prohibition period, a later ended period between a period in which the received flag is in the OFF state and a period in which the latch flag is in the OFF state. Even when the data storage processor 225b abnormally receives the synchronization data within the synchronization prohibition period, the data storage processor 225b does not start the transmitting process.

Specifically, when the data storage processor 225b receives the synchronization ID from the ID reader 225a, the data storage processor 225b determines whether a predetermined condition (here, a condition in which the received flag is in the ON state and the latch flag is in the ON state) is satisfied. When the predetermined condition is not satisfied, the synchronization ID received from the ID reader 225a is destroyed.

On the other hand, when the predetermined condition is satisfied, that is, the received flag is in the ON state and the latch flag is in the ON state, the data storage processor 225b starts the transmitting process in step S34 of FIG. 7 in spite of the fact that some synchronization data is abnormally transmitted, when receiving the synchronization data.

In this case, the transmitting process is executed twice in one communication period. However, there is no problem since the transmission and reception of the frame data in the current communication period are completed and the latching process of latching the frame data to be transmitted in the subsequent communication period is also completed.

As illustrated in FIG. 7, the state of the received flag is set to OFF and the state of the latch flag is set to OFF, when the abnormally transmitted synchronization data is received. Therefore, the data storage processor 225b destroys the synchronization ID included in the synchronization data in step S35 of FIG. 7, even when receiving the synchronization data normally transmitted at the time of starting the subsequent communication period. However, there is no problem, since the transmission start timing from the motor ECU 2 is advanced only by the communication period.

When a predetermined condition (here, a condition in which the received flag is in the ON state) is satisfied but the latching process is not completed, the data storage processor 225b does not start the transmitting process even when receiving the synchronization data.

Accordingly, by receiving the synchronization data before completion of the latching process of latching the frame data to be transmitted in the subsequent communication period, it is possible to prevent the same data as the frame data transmitted in the current communication period from being transmitted in the subsequent communication period.

The example has hitherto been described in which the latch lag is applied when the received flag is in the ON state as the predetermined condition. However, the latch flag may be applied when a predetermined time is elapsed after the reception of the synchronization data as a predetermined condition.

In this case, when the predetermined time is elapsed after the reception of the synchronization data but the latch flag is in the OFF state, the data storage processor 225b may not start the transmitting process even when receiving the synchronization data.

When the motor ECU 2 receives the synchronization data within the synchronization prohibition period, the motor ECU 2 does not execute a predetermined process such as a process of starting the transmitting process based on the synchronization ID. However, the data information transmitted together with the synchronization ID may be used in the calculating process without being destroyed.

Figure 8:
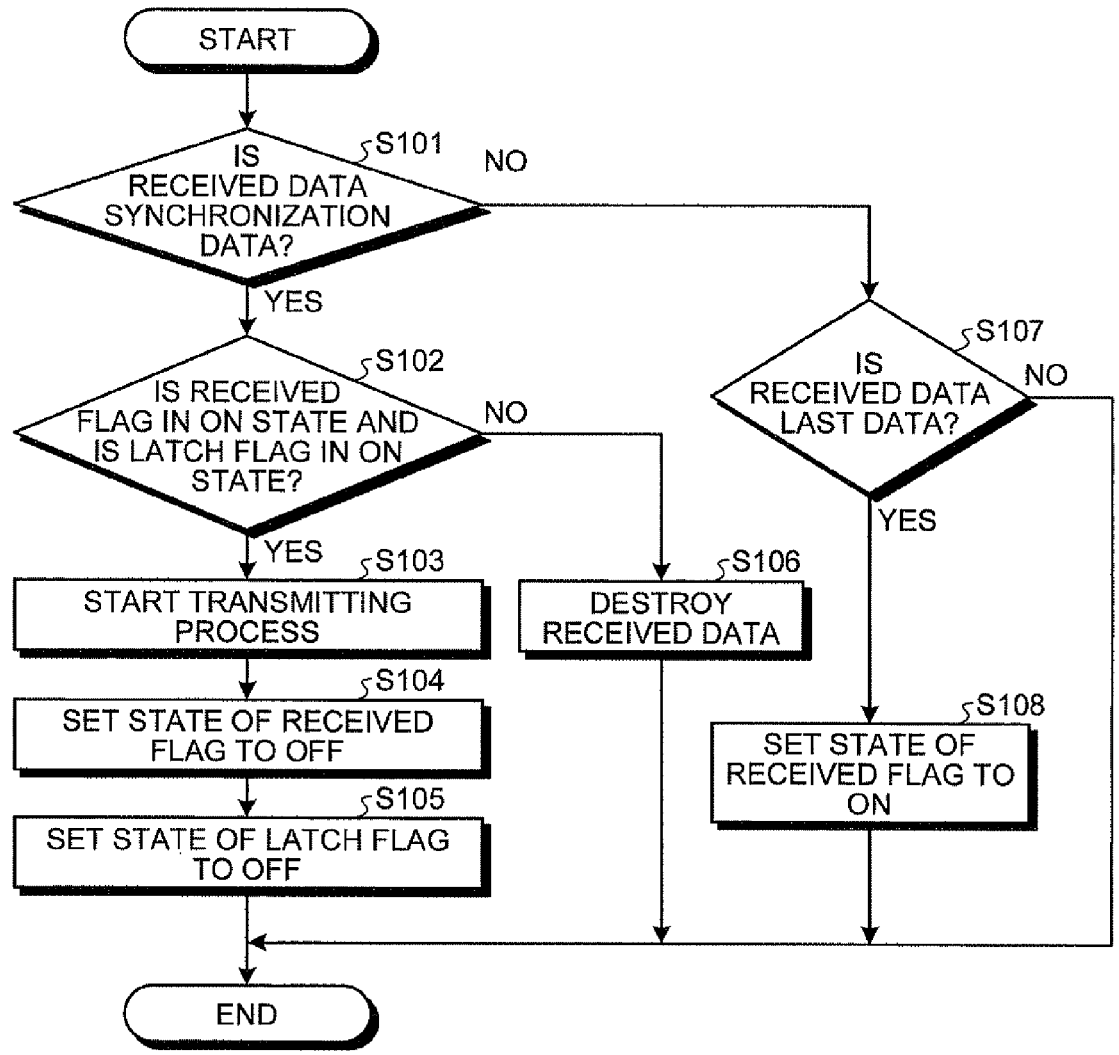
FIG. 8 is a flowchart (first flowchart) illustrating an example of a processing sequence executed by the motor ECU.

Next, a specific process of the motor ECU 2 will be described with reference to FIG. 8. FIG. 8 is a flowchart (first flowchart) illustrating an example of the processing sequence of the motor ECU 2. In FIG. 8, the processing sequence is executed when a reception interruption occurs from a hardware unit. More specifically, FIG. 8 illustrates the processing sequence of the process illustrated in FIG. 7, that is, the process when the synchronization prohibition period is determined based on the received flag and the latch flag.

As illustrated in FIG. 8, in step S101, the controller 225 of the motor ECU 2 determines whether the received frame data is the synchronization data. Specifically, the controller 225 determines that the received frame data is the synchronization data, when the ID included in the received frame data is the synchronization ID.

When the controller 225 determines that the received frame data is the synchronization data (Yes in step S101), the controller 225 determines whether the received flag is in the ON state and the latch flag is in the ON state in step S102. When the received flag is in the ON state and the latch flag is in the ON state (Yes in step S102), the transmitting process is started in step S105. Then, in step S104, the controller 225 sets the state of the received flag to OFF. In step S105, the controller 225 sets the state of the latch flag to OFF.

When the controller 225 determines that the received frame data is the synchronization data, the controller 225 determines a kind of data based on the ID. Data information (information stored in a data region) transmitted together with the synchronization ID is the determined kind of data (for example, data regarding a torque instruction value), and is used in the subsequent calculating process.

When the condition, in which the received flag is in the ON state and the latch flag is in the ON state, is not satisfied in step S102 (No in step S102), the controller 225 destroys the received data in step S106. As a result, the transmitting process is not started.

On the other hand, when the received frame data is not the synchronization data in step S101 (No in step S101), the controller 225 determines whether the received data is the final data in step S107. When the controller 225 determines that the received data is the final data (Yes in step S107), the controller 225 sets the state of the received flag to ON in step S108.

When the processes of step S105, step S106, and step S108 are completed or the received data is not the final data in step S107 (No in step S107), the controller 225 ends the process. The processes of the flowchart (first flowchart) are repeated whenever a reception interruption occurs.

Figure 9:
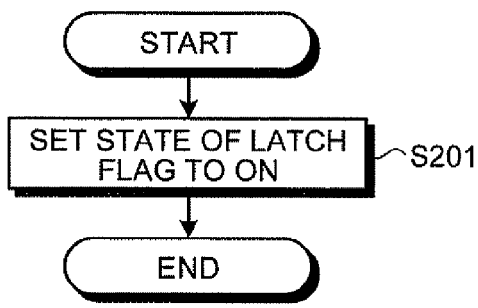
FIG. 9 is a flowchart (second flowchart) illustrating an example of a processing sequence executed by the motor ECU.

Next, a processing sequence executed by the motor ECU 2 will be described with reference to FIG. 9 when the communication period of the motor ECU 2 is started. FIG. 9 is a flowchart (second flowchart) illustrating an example of the processing sequence executed by the motor ECU 2. As illustrated in FIG. 9, in step S201, the controller 225 of the motor ECU 2 sets the state of the latch flag to ON in a new communication period.

In the exemplary embodiment, as described above, the data storage processor of the HV-ECU 1 transmits, to the motor ECU 2, the frame data that includes the ID information indicating a kind of data and the data information indicating the contents of the data. Further, when the calculation processor of the motor ECU 2 receives the frame data from the HV-ECU 1, the calculation processor determines that the data information stored in the received frame data is the data regarding the kind of data indicated by the ID information of the received frame data. Then, the calculation processor executes a predetermined calculating process based on the data information.

When the ID information of the frame data received from the HV-ECU is the synchronization ID, the data storage processor of the motor ECU executes the predetermined calculating process based on the data information and starts the transmitting process of transmitting, to the HV-ECU, the frame data to be transmitted within the communication period. Accordingly, the efficiency of the data communication can be improved.

The communication system according to the exemplary embodiment of the invention has hitherto been described in detail with reference to the drawings, but is just an example. It is apparent to those skilled in the art that the communication system may be modified and improved according to other exemplary embodiments of the invention.

For example, in the above-described exemplary embodiment, the case has been described in which the HV-ECU divides the frame data, which is calculated in advance (that is, calculated in the previous communication period), to be transmitted in one period (the current communication period) in each predetermined period (the communication processing period) and sets the divided data in the transmitting buffer.

However, the invention is not limited thereto. The HV-ECU may start a predetermined calculating process after start of the communication period and may set the frame data, which is not transmitted at that time, in the transmitting buffer by using the data calculated up to that time, whenever a predetermined period (communication processing period) is elapsed. In this case, the HV-ECU may set the number of frame data determined at each time in the transmitting buffer or may change the number of frame data determined at each communication processing period in accordance with a calculation processing progress state.

In the above-described exemplary embodiment, the case has been described in which the data storage processor 225b starts the transmitting process of storing the data to be transmitted to the HV-ECU 1 in the transmitting buffer 222 via the platform 224 when the ID read by the ID reader 225a is the synchronization ID, but the invention is not limited thereto. For example, the hardware unit of the motor ECU 2 may have a function of identifying the synchronization ID so that the transmitting process is automatically started.

In the above-described exemplary embodiment, the case has been described in which the start of the communication period can be known by determining that the frame data of the determined ID is transmitted as the frame data initially transmitted in one communication period between the communication apparatuses.

However, the communication system according to the invention is not limited thereto. The transmission completion (or the reception completion) may be known by determining the frame data of the determined ID as the frame data finally transmitted in one communication period between the communication apparatuses.

The communication system and the communication apparatus disclosed in the present invention are effective when the efficiency of the data communication is attempted to be improved, and particularly, may be applied to an in-vehicle network in which in-vehicle ECUs are connected to each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system in which a first communication apparatus transmits/receives data to/from a second communication apparatus at a predetermined communication period, the system comprising:

the first communication apparatus that includes a first computer transmitting, to the second communication apparatus, frame data including ID information indicating a kind of data and data information indicating a content of the data; and the second communication apparatus that includes a second computer executing a first process, the first process determining that data information included in received frame data is data regarding a kind of data of ID information included in received frame data when the frame data is received from the first communication apparatus, the first process further executing a predetermined calculating process using the data information, wherein when the ID information of the frame data received from the first communication apparatus is not a predetermined ID indicating a start of the predetermined communication period among a plurality of kinds of IDs, the second computer determines the data information included in received frame data based on the ID information included in received frame data and processes the first process using the data information determined, when the ID information of the frame data received from the first communication apparatus is the predetermined ID, the second computer determines receiving an instruction to start a second process and executes the first process using the data information of the received frame data and the second process, the second process starting transmitting frame data to be transmitted within the communication period to the first communication apparatus, and until a predetermined time elapses after the reception of the frame data including the predetermined ID, the second computer does not start the second process even when the frame data including the predetermined ID is received.

2. The communication system according to claim 1, wherein the predetermined time is a time between when the frame data including the predetermined ID is received and when the communication period for receiving the frame data ends.

3. The communication system according to claim 1, wherein until transmission and reception of all frame data to be transmitted and received within the communication period are completed after the frame data including the predetermined ID is received, the second computer does not start the second process even when the frame data including the predetermined ID is received.

4. The communication system according to claim 1, wherein the second computer executes a latching process of acquiring all frame data to be transmitted within the communication period before a corresponding communication period together, and wherein when the predetermined condition is satisfied but the latching process is not completed, the second computer does not start the second process even when the frame data including the predetermined ID is received.

5. The communication system according to claim 1, wherein the first computer initially transmits the frame data including the predetermined ID among the frame data to be transmitted within the communication period.

6. A communication apparatus in a communication system in which a first communication apparatus transmits/receives data to/from a second communication apparatus at a predetermined communication period, the communication apparatus comprising:

a computer that executes a first process, the first process determining that data information included in received frame data is data regarding a kind of data of ID information included in received frame data when the frame data is received from another communication apparatus, the first process further executing a predetermined calculating process using the data information, wherein when the ID information of the frame data received from the first communication apparatus is not a predetermined ID indicating a start of the predetermined communication period among a plurality of kinds of IDs, the computer determines the data information included in received frame data based on the ID information included in received frame data and processes the first process using the data information determined, when the ID information of the frame data received from the other communication apparatus is the predetermined ID, the computer determines receiving an instruction to start a second process and executes the first process using the data information of the received frame data and the second process, the second process of transmitting frame data to be transmitted within the communication period to the another communication apparatus, and until a predetermined time elapses after the reception of the frame data including the predetermined ID, the second computer does not start the second process even when the frame data including the predetermined ID is received.

* * * * *